United States Patent
Raskar et al.

(10) Patent No.: US 9,549,129 B2
(45) Date of Patent: Jan. 17, 2017

(54) METHOD AND APPARATUS FOR OBTAINING IMAGE

(71) Applicant: Nokia Corporation, Espoo (FI)

(72) Inventors: Ramesh Raskar, Cambridge, MA (US); Rajeswari Kannan, Bangalore (IN); Pranav Mishra, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 16 days.

(21) Appl. No.: 14/046,277

(22) Filed: Oct. 4, 2013

(65) Prior Publication Data

US 2015/0098014 A1    Apr. 9, 2015

(51) Int. Cl.
*H04N 5/353* (2011.01)
*H04N 5/235* (2006.01)

(52) U.S. Cl.
CPC .......... *H04N 5/3532* (2013.01); *H04N 5/2354* (2013.01)

(58) Field of Classification Search
None
See application file for complete search history.

(56) References Cited

U.S. PATENT DOCUMENTS

| 7,129,983 B2 * | 10/2006 | Rantanen et al. ............ 348/371 |
| 8,368,624 B2 * | 2/2013 | Liao et al. ...................... 345/87 |
| 2006/0008171 A1 | 1/2006 | Petschnigg et al. .......... 382/254 |
| 2010/0182458 A1 | 7/2010 | Steinberg et al. ............ 348/239 |
| 2010/0309333 A1 | 12/2010 | Smith et al. ................ 348/230.1 |
| 2011/0001859 A1 * | 1/2011 | Matsuura et al. ............ 348/296 |
| 2011/0273591 A1 | 11/2011 | Fukushima .................... 348/239 |
| 2013/0070121 A1 | 3/2013 | Gu et al. ....................... 348/239 |

OTHER PUBLICATIONS

Baker. Simon, et al., "Removing Rolling Shutter Wobble", http://research.microsoft.com/pubs/121489/main.pdf>, Mar. 2010, 17 pgs.
Bradley, Derek, et al., "Synchronization and rolling Shutter Compensation for Consumer Video Camera Arrays", http://www.cs.ubc.ca/~heidrich/Projects/ProCam.09.pdf>; 8 pgs.
"Exposure and Strobe Delay vs. Shutter Type Timing", Lumenera Corporation, http://www.lumenera.com/support/pdf/LA-2104-ExposureVsShutterTypeTimingAppNote.pdf>, Feb. 2005, 4 pgs.

* cited by examiner

*Primary Examiner* — Roberto Velez
*Assistant Examiner* — Yih-Sien Kao
(74) *Attorney, Agent, or Firm* — Harrington & Smith

(57) ABSTRACT

A method comprising reading out first lines of pixels of a sensor, when the first lines are read out in a sequence of the first lines in a first direction along the sensor also reading out different second lines of the pixels of the sensor, when the second lines are read out in a sequence of the second lines in a different second direction along the sensor and interleaving the read outs from the first lines of pixels and the different second lines of pixels.

22 Claims, 6 Drawing Sheets

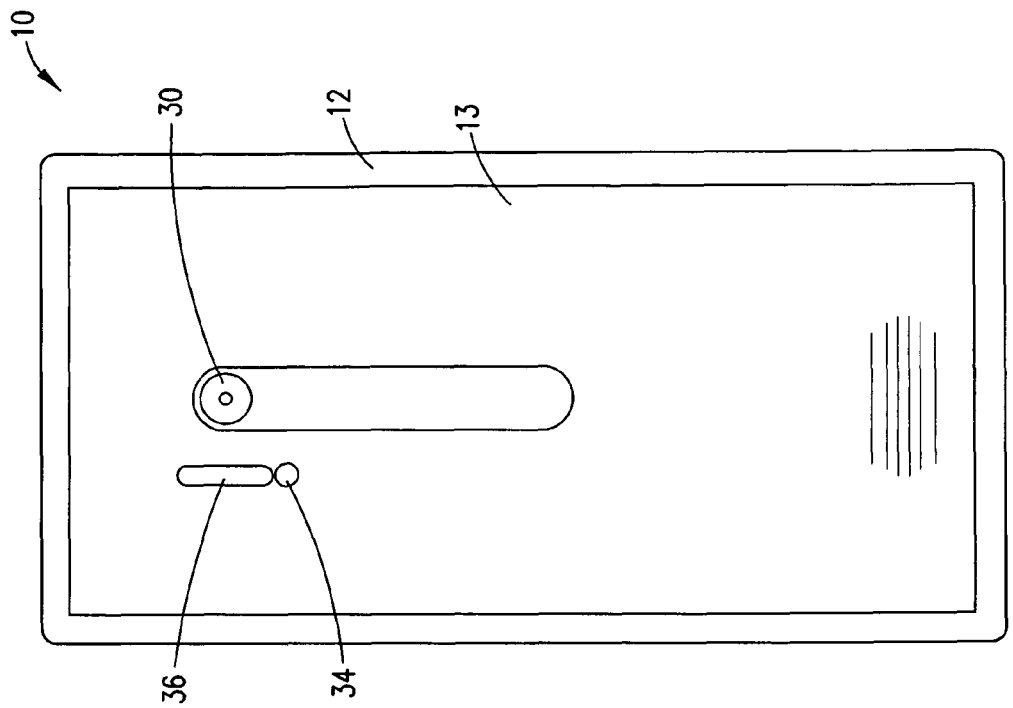
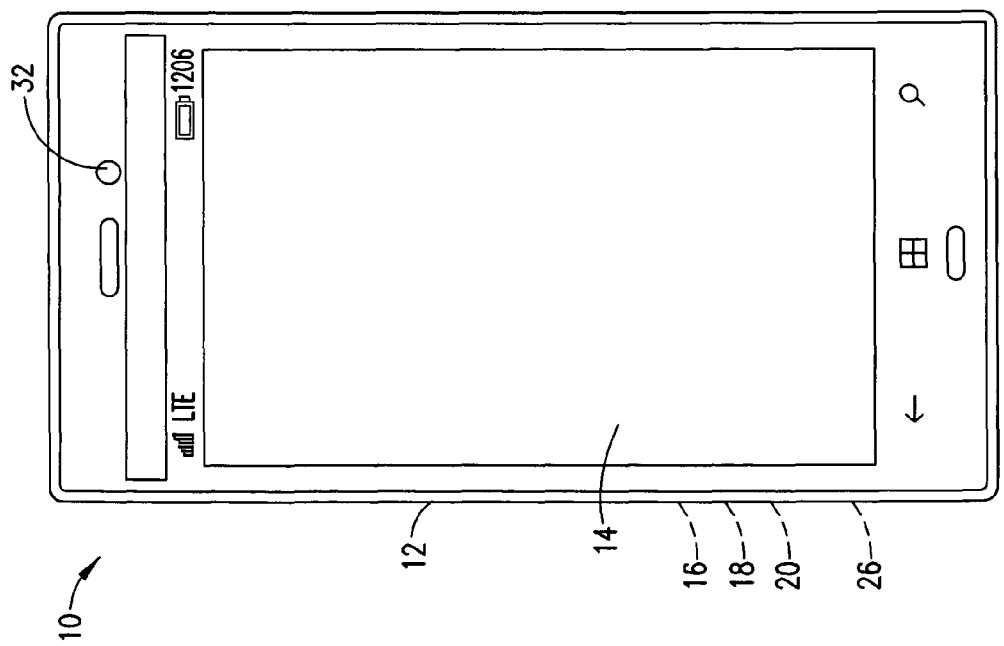

METHOD AND APPARATUS FOR OBTAINING IMAGE

BACKGROUND

Technical Field

The exemplary and non-limiting embodiments relate generally to digital image creation and, more particularly, to improving the quality of images taken using a rolling shutter image sensor.

Brief Description of Prior Developments

Digital images are created using pixel sensors that convert light energy into an electrical signal. Most common image sensors have pixel sensors arranged in rows and columns and have associated electrical circuitry. The circuitry reads out the electrical signals from which an image can be formed. When a flash is used the quality of the image can be impaired. Different methods have been used to prevent or correct the image created using a flash. One method that has been used is to combine two images, one with flash and one without flash. Various methods of this type generally do not generate a quality image because of latency involved in the capture, take too long or use too much memory.

SUMMARY

The following summary is merely intended to be exemplary. The summary is not intended to limit the scope of the claims.

In accordance with one aspect, an example method comprises reading out first lines of pixels of a sensor, where the first lines are read out in a sequence of the first lines in a first direction along the sensor, reading out different second lines of the pixels of the sensor, where the second lines are read out in a sequence of the second lines in a different second direction along the sensor and interleaving the read outs from the first lines of pixels and the second lines of pixels.

In accordance with another aspect, an example apparatus comprises at least one processor, and at least one memory including computer program code, the at least one memory and the computer program code configured to, with the at least one processor, cause the apparatus to generate data read out from first lines of pixels of a sensor, where the first lines are read out in a sequence of the first lines in a first direction along the sensor, read out different second lines of the pixels of the sensor, where the second lines are read out in a sequence of the second lines in a different second direction along the sensor, and interleave the data read out from both the first lines of pixels with the different second lines of pixels.

In accordance with another aspect, an example non-transitory program storage device readable by a machine is provided, tangibly embodying a program of instructions executable by the machine for performing operations, the operations comprising: reading out first lines of pixels of a sensor, where the first lines are read out in a sequence of the first lines in a first direction along the sensor, reading out different second lines of the pixels of the sensor, where the second lines are read out in a sequence of the second lines in a different second direction along the sensor; and interleaving the read outs from the first lines of pixels and the second lines of pixels.

BRIEF DESCRIPTION OF THE DRAWINGS

The foregoing aspects and other features are explained in the following description, taken in connection with the accompanying drawings, wherein:

FIG. 1 is a front view of an example embodiment of an apparatus comprising features as described herein;

FIG. 2 is a rear view of the apparatus shown in FIG. 1;

DETAILED DESCRIPTION OF EMBODIMENTS

Figure 3:
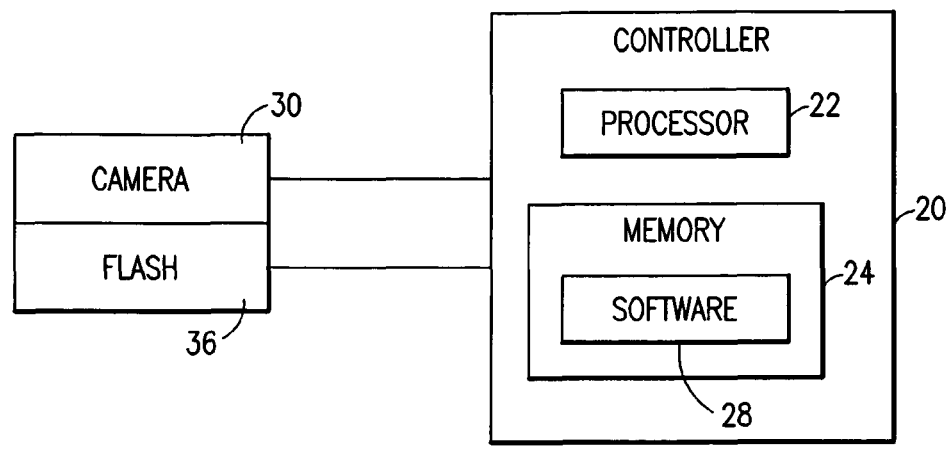
FIG. 3 is a block diagram illustrating some of the components of the apparatus shown in FIGS. 1-2.

Referring to FIG. 1, there is shown a front view of an apparatus 10 incorporating features of an example embodiment. Although the features will be described with reference to the example embodiment shown in the drawings, it should be understood that features can be embodied in many alternate forms of embodiments. In addition, any suitable size, shape or type of elements or materials could be used.

The apparatus 10 may be a hand-held portable apparatus, such as a communications device which includes a telephone application for example. In the example shown the apparatus 10 is a smartphone which includes a camera and a camera application. The apparatus 10 may additionally or alternatively comprise an Internet browser application, a video recorder application, a music player and recorder application, an email application, a navigation application, a gaming application, and/or any other suitable electronic device application. In an alternate example embodiment the apparatus might not be a smartphone. For example, the apparatus might be a SLR type of camera.

Referring also to FIGS. 2-3, the apparatus 10, in this example embodiment, comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) having components such as the controller 20 thereon. The receiver 16 and transmitter 18 form a primary communications system to allow the apparatus 10 to communicate with a wireless telephone system, such as a mobile telephone base station for example.

In this example, the apparatus 10 includes the camera 30 which is located at the rear side 13 of the apparatus, a front camera 32, an LED 34, and a flash system 36. In one type of alternate example embodiment more than one camera could be provided at the rear side 13. The LED 34 and the flash system 36 are also visible at the rear side of the apparatus, and are provided for the camera 30. The cameras 30, 32, the LED 34 and the flash system 36 are connected to the controller 20 such that the controller 20 may control their operation.

Figure 4:
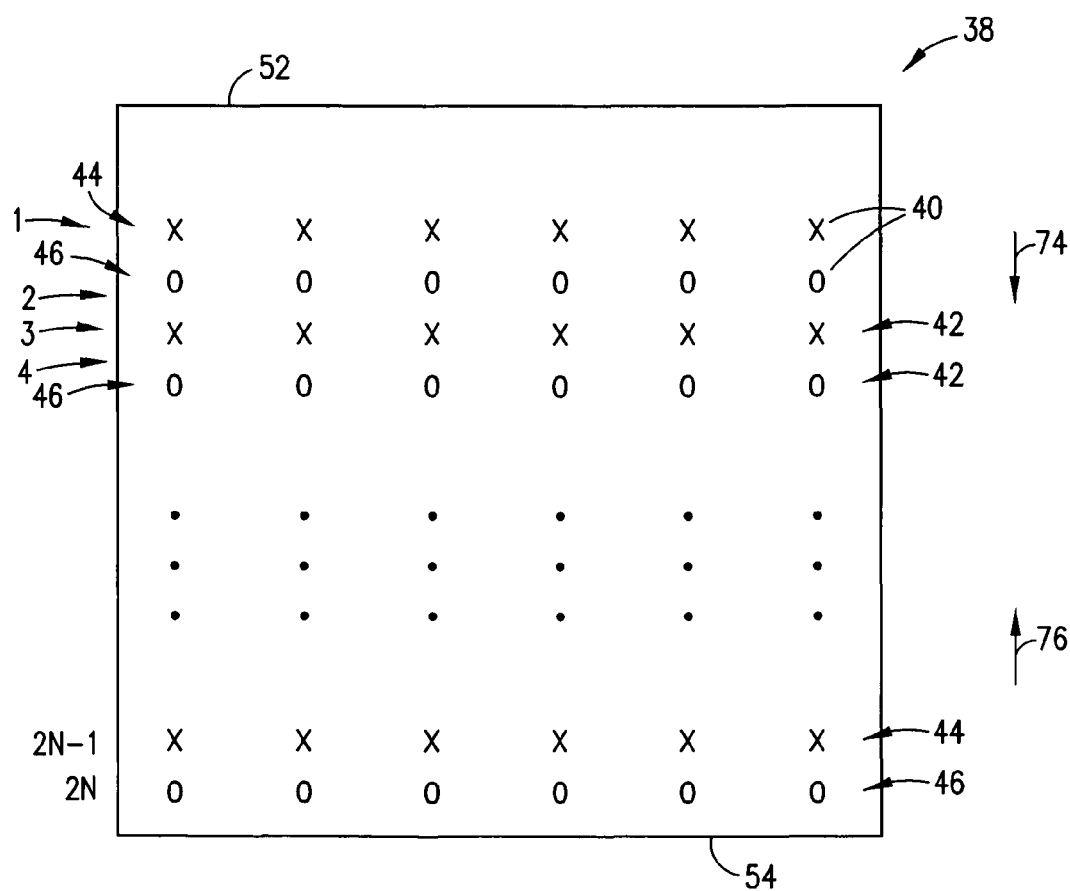
FIG. 4 is a schematic diagram illustrating pixels in lines of a sensor.

Referring also to FIG. 4, the camera 30 comprises a sensor 38. In this example embodiment the sensor 38 is a rolling shutter image sensor. The sensor 38 includes an array of pixels 40, represented in this illustration as "X"s and "O"s for purposes of row differentiation as further understood from the description below. FIG. 4 is merely a schematic representation of the pixels. The sensor 38 may comprise thousands of pixels, for example, arranged in an array of columns and rows for example. The array of pixels 40 are of a type for converting light energy into an electrical charge read out in the form of data signals for producing an image.

Generally, the pixels 40 are arranged in lines or rows 42. The rows 42, in this example embodiment, are grouped into first lines 44 of the pixels (illustrated by the "X" pixels) and different second lines 46 of pixels (illustrated by the "O" pixels). The lines of pixels may be grouped by rows as shown in this example, or columns or any other form of grouping. In addition, although two groups are described in this example, more than two groups of lines may be used in alternate examples.

In the example embodiment shown, the first lines 44 of pixels are in odd numbered rows of the array and the different second lines 46 of pixels are in the even numbered rows of the array. Thus, as seen in FIG. 4, Rows 1 and 3 are members of the first lines 44, and Rows 2 and 4 are members of the second lines 46. The first lines 44 of the pixels are non-adjacent to each other in the pixel array; having individual ones of the second lines 46 therebetween. The second lines 46 of the pixel array are also non-adjacent to each other; having individual ones of the first rows 44 therebetween. Thus, the first rows 44 and second rows 46 are interleaved with one another in the array; adjacent to one another. This creates an alternating sequence of odd number lines 44 of pixels with even numbered lines 46 of pixels within the pixel array. In the exemplary embodiment shown, the odd numbered lines 44 start at a first edge 52 of pixel array and progress toward the opposite edge 54 of pixel array.

Figure 5:
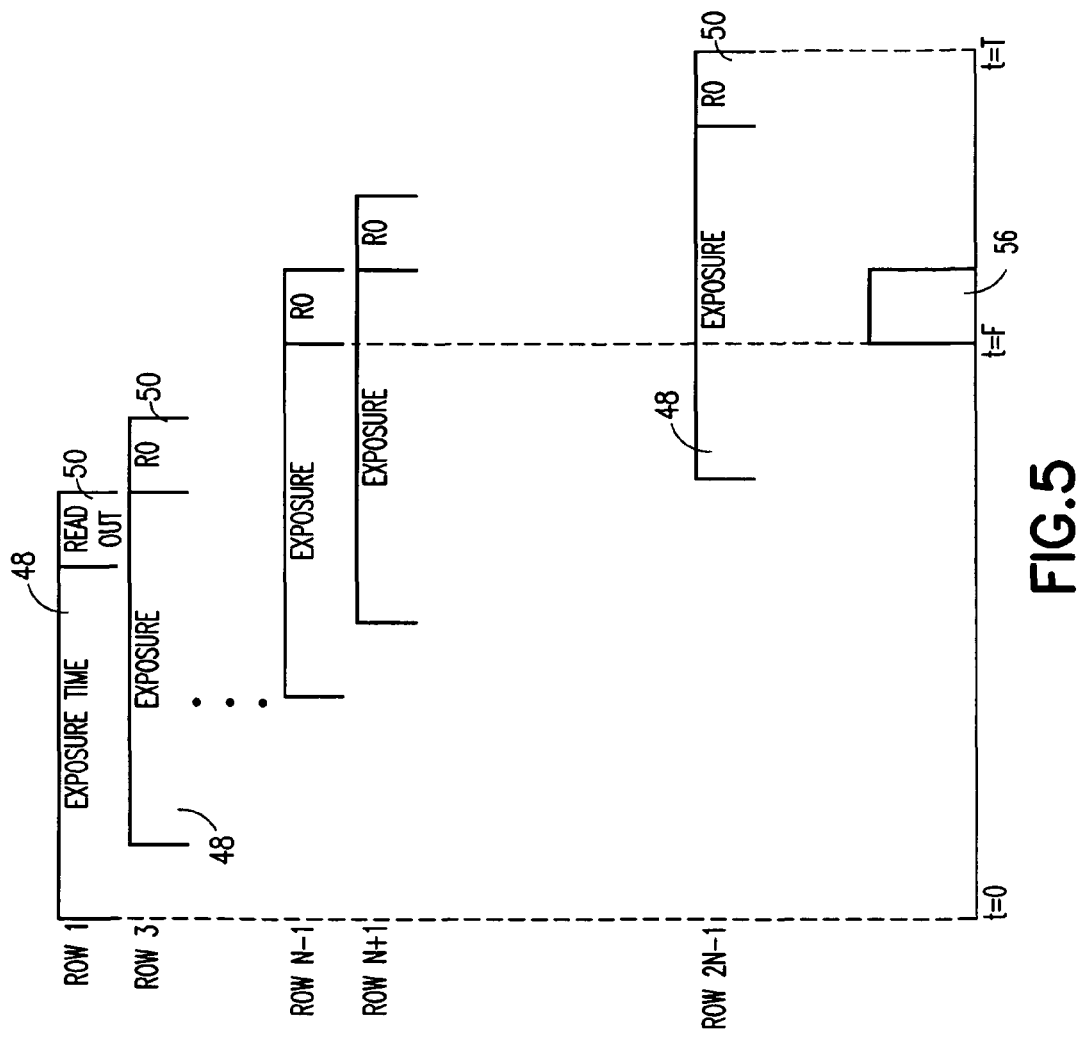
FIG. 5 is a partial timing diagram for the sensor shown in FIG. 4 of some of its lines of pixels.
Figure 6:
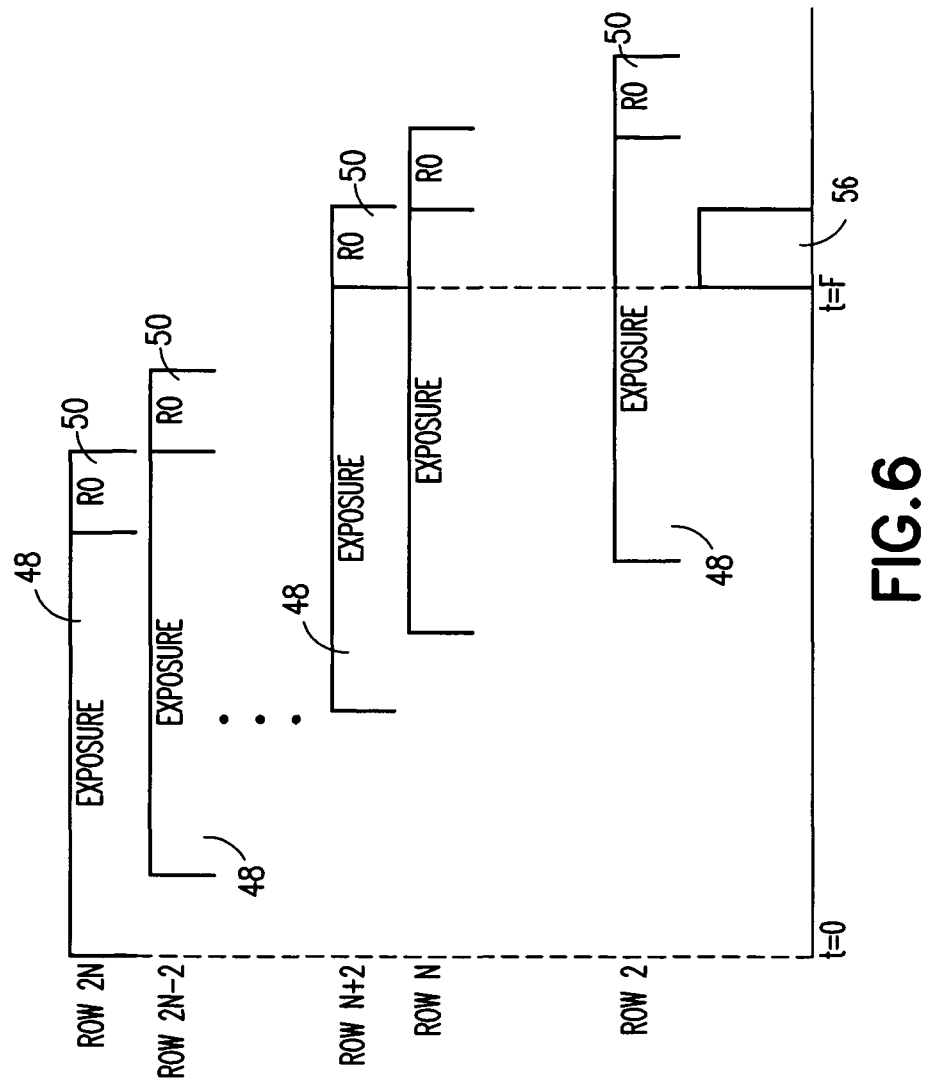
FIG. 6 is another partial timing diagram for the sensor shown in FIG. 4 of some other ones of the lines of pixels.

When the image sensor 38 is used to capture an image, the rows 42 of pixels 40 each have a respective exposure time and subsequent read out time. FIG. 5 is a diagram illustrating the exposure 48 and readout 50 for each of the first lines 44 over time during an image capture event. The capture event occurs from time t=0 to time t=T, where T is the end time of the capture event. FIG. 6 is a diagram illustrating the exposure 48 and readout 50 for each of the second lines 46 over time during the same image capture event. In this example the rolling shutter sensor 38 uses sequentially timed exposure periods 48 for each group of lines 44, 46. A read out 50 of each line or row of pixels follows after the respective exposure period 48 for each line.

As seen from FIG. 5, the first lines 44 are exposed and read out from the top 52 (see FIG. 4) of the sensor 38 (starting at Row 1) in a sequence towards the bottom 54 (see FIG. 4) of the sensor 38 ending at the last odd numbered row. Thus, the sequence in this example is Row 1, Row 3, Row 5, ... Row 2N–1 (where N=½ the total number of rows in the array). In this example, a flash trigger 56 occurs at time t=F. The flash trigger 56 is the time during the capture event in which the flash 36 is activated. In the example shown the flash trigger 56 occurs at the start of the readout at line N–1 of the first lines 44; the middle odd number line between the top 52 and bottom 54 ends of the array. For example, if the total number of lines is 100, then N=50, and the flash trigger 56 may occur at the start of the read out for the line 49 (N–1).

As seen from FIG. 6, the second lines 46 are exposed and read out from the bottom 54 (see FIG. 4) of the sensor 38 (starting at the bottom last row 2N in the array) in a sequence towards the top 52 (see FIG. 4) of the sensor 38 ending at the first even numbered row; Row 2. Thus, the sequence is Row 2N, Row 2N–2, Row 2N–4 ... Row 2. As noted above, in this example the flash trigger 56 occurs at time t=F. The flash trigger 56 is the time during the capture event in which the flash 36 is activated. In the example shown the flash trigger 56 occurs at the start of the readout at line N of the second lines 46; the middle even number line between the top 52 and bottom 54 ends of the array. For example, if the array has 100 rows (50 which are even number and 50 which are odd number), then N=50.

When the read out of data from the pixel array starts, line 1 of the odd lines 44 and line 2N of the even lines 46 are read out at a same time or one right after the other. The readouts 50 of the first lines 44 continue sequentially from Row 1 at the top edge 52 of the array towards the last odd line 2N–1 at the bottom of the array. The readouts 50 of the second lines 46 continue sequentially from Row 2N at the bottom edge 54 of the array towards the first even line 2 at the top of the array. Thus, the readouts from the first lines 44 occur sequentially from top 52 towards bottom 54, but the readouts from the second lines 46 occur sequentially from the bottom 54 towards the top 52. In other words, the readouts of the first and second lines occur in opposite directions relative to each other on the array; top-to-bottom and bottom-to-top. The top-to-bottom readouts and the bottom-to-top readouts occur at a same time or one right after the other (44→46→44→46→ ... ); just in opposite directions along the sensor 38. This may reduce the total time to read out the entire pixel array in half. This method can be used for non-flash image creation as well as flash photography.

In the example embodiment shown, the flash trigger 48 occurs such that substantially half of the first lines 44 of pixels are exposed 48 during the flash and substantially half of the second lines 46 of pixels are exposed 48 during the flash. In particular, in this example this would be the second half of the first lines 44 (line N+1 to line 2N–1) and the first half of the second lines 46 (line N to line 2). For the example of an array with 100 lines, this would be the odd number lines between lines 51-99 and the even number lines between lines 50-2. The flash trigger 48 is timed such that light from the flash 36 does not occur during the exposure of the top half of the first lines 44 and does not occur during the exposure of the bottom half of the second lines 46. In particular, in this example the flash trigger 48 is timed such that light from the flash 36 does not occur during the exposure of the first image-half of the first lines 44 (line 1 to line N–1) and the second image-half of the second lines 46 (line 2N to line N+2). For the example of an array with 100 lines, the flash trigger 48 would, thus, be timed such that light from the flash 36 does not occur:

during the exposure of the first image-half 60a (see FIG. 7) formed from the odd number lines 44 between lines 1-49, and during the exposure of the second image-half 60b (see FIG. 7) formed from the even number lines 46 between lines 100-52.

The duration of the flash may vary and may even strobe. In an exemplary embodiment, about half of the odd numbered lines of pixels closest to the first edge 52 and about half of the even numbered lines closest to the opposite edge 54 are not exposed to a flash; forming half of the data for the new single image to be formed. The remainder of the odd numbered lines of pixels closest to the opposite side 54 and the remainder of the even numbered lines of pixels closest to the first edge 52 may be exposed to the flash producing about half the data to form the new single frame from both flash and non-flash data.

Figure 7:
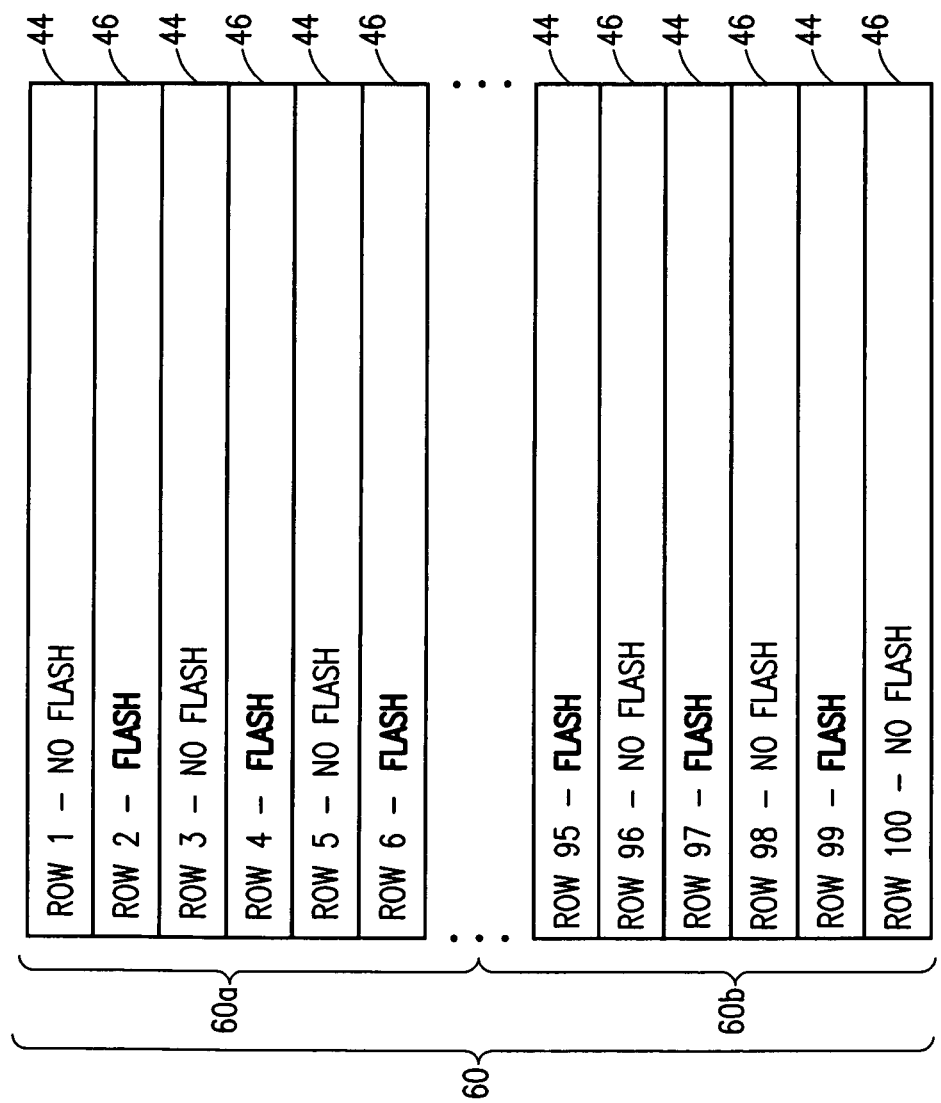
FIG. 7 is a schematic diagram of an image formed by interleaving data from rows of the first and second lines of pixels.

The unique embodiment described above uses data produced from the entire pixel array where only alternating lines or rows of pixels might be exposed during the flash. Referring also to FIG. 7, the new image 60 may be formed from the readouts 50 of the rows where the odd numbered lines 44 used for the top half 60a where not formed with the flash, but the even numbered lines 46 used for the top half 60a were formed with use of the flash. Likewise, the even numbered lines 46 used for the bottom half 60b where not formed with the flash, but the odd numbered lines 44 used for the bottom half 60b were formed with use of the flash.

Figure 8:
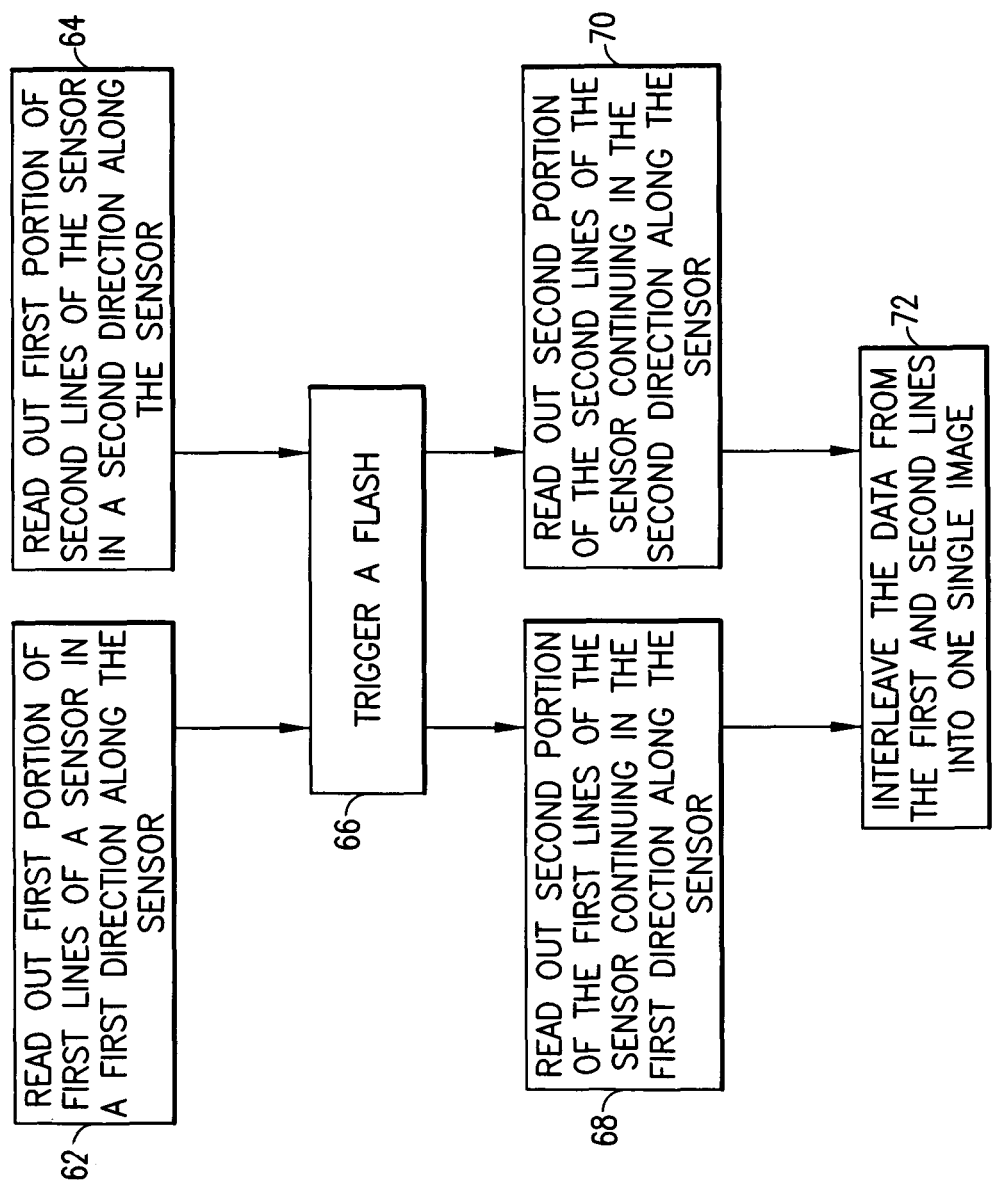
FIG. 8 is a diagram illustrating an example method.

Referring also to FIG. 8, an example method may comprise reading out a first portion of the first lines 44 of the sensor 38 in a first direction 74 (see FIG. 4) long the sensor as indicated by block 62, reading out a first portion of the second lines 46 of the sensor 38 in a second direction 76 (see FIG. 4) long the sensor as indicated by block 64, triggering a flash as indicated by block 66, reading out a second portion of the first lines 44 of the sensor 38 continuing in the first direction 74 long the sensor as indicated by block 68, reading out a second portion of the second lines 46 of the sensor 38 continuing in the second direction 76 long the sensor as indicated by block 70, and interleaving the data from the first and second lines into one single image 60 as indicated by block 72.

An example method may comprise reading out first lines of pixels of a sensor, when the first lines are read out in a sequence of the first lines in a first direction along the sensor, reading out different second lines of the pixels of the sensor, when the second lines are read out in a sequence of the second lines in a different second direction along the sensor, and interleaving the read outs from the first lines of pixels and the second lines of pixels.

The method may include reading out the first lines of pixels and the different second lines of pixels starting at substantially the same time and continuing sequentially substantially simultaneously. The method may include reading out first lines of pixels wherein the first lines of pixels are arranged in non-adjacent lines of pixels and different second lines of pixels are adjacent to first lines of pixels forming an alternating sequence of first lines of pixels and different second lines of pixels.

The method may include reading out the first lines of pixels starts at substantially the same time as reading out of the different second lines of pixels. The method may include reading out the first lines of pixels in a first direction along the sensor starts at a first edge of the sensor and progresses toward an opposite edge of the sensor and reading out the different second lines of pixels in a different second direction starts at the opposite edge of the sensor and progresses toward the first edge of the sensor such that the first lines of pixels and the different second lines of pixels are read out sequentially in substantially opposite directions.

The method may comprise a flash occurring at a predetermined time such that a plurality, but not all, of the first lines of pixels and a plurality, but not all, of the different second lines of pixels are being exposed when the flash occurs. The method may comprise the flash occurring when, exposure of substantially half of the first lines of pixels has ended and exposure of a remainder of first lines of pixels begins; and exposure of substantially half of the different second lines of pixels has ended and exposure of a remainder of different second lines of pixels begins.

The method may comprise the first lines of pixels and the different second lines of pixels being read out using a rolling shutter configuration with the first lines of pixels being located on odd lines of pixels and different second lines of pixels being located on even lines of pixels with odd lines of pixels being adjacent to even lines of pixels and wherein; reading out odd lines of pixels sequentially from a first edge of the sensor toward an opposite edge and reading out even lines of pixels sequentially from the opposite edge toward the first edge with read out of both odd lines of pixels and even lines of pixels starting at the same time and continuing substantially simultaneously.

The method may comprise substantially half of the odd lines of pixels and substantially half of the even lines of pixels corresponding to the rolling shutter configuration being exposed when a flash occurs; and interleaving lines of pixels together such that adjacent lines of pixels were alternately exposed during the flash and exposed without flash forming a new single image partially exposed to flash and partially not exposed to flash.

An example apparatus may comprise at least one processor, and at least one memory including computer program code; the at least one memory and the computer program code configured to, with the at least one processor, cause the apparatus to generate data read out from first lines of pixels of a sensor, when the first lines are read out in a sequence of the first lines in a first direction along the sensor; read out different second lines of the pixels of the sensor, when the second lines are read out in a sequence of the second lines in a different second direction along the sensor; and by interleaving the data read out from both the first lines of pixels with the different second lines of pixels.

The apparatus may be configured for reading out the first lines of pixels and the different second lines of pixels starts at substantially the same time and continues sequentially substantially simultaneously.

The apparatus may be configured for reading out first lines of pixels wherein the first lines of pixels are arranged in non-adjacent lines of pixels and different second lines of pixels are adjacent to first lines of pixels forming an alternating sequence of first lines of pixels and different second lines of pixels.

The apparatus may be configured for reading out the first lines of pixels starts at substantially the same time as reading out of the different second lines of pixels.

The apparatus may be configured for reading out the first lines of pixels in a first direction along the sensor starts at a first edge of the sensor and progresses toward an opposite edge of the sensor and reading out the different second lines of pixels in a different second direction starts at the opposite edge of the sensor and progresses toward the first edge of the sensor such that the first lines of pixels and the different second lines of pixels are read out sequentially in substantially opposite directions.

The apparatus may be configured for a flash occurring at a predetermined time such that a plurality, but not all, of the first lines of pixels and a plurality, but not all, of the different second lines of pixels are being exposed when the flash occurs.

The apparatus may be configured for the flash occurring when exposure of substantially half of the first lines of pixels has ended and exposure of a remainder of first lines of pixels begins; and exposure of substantially half of the different second lines of pixels has ended and exposure of a remainder of different second lines of pixels begins.

The apparatus may be configured for the first lines of pixels and the different second lines of pixels being read out using a rolling shutter configuration with the first lines of pixels being located on odd lines of pixels and different second lines of pixels being located on even lines of pixels with odd lines of pixels being adjacent to even lines of pixels and wherein; reading out odd lines of pixels sequentially from a first edge of the sensor toward an opposite edge and reading out even lines of pixels sequentially from the opposite edge toward the first edge with read out of both odd lines of pixels and even lines of pixels starting at the same time and continuing substantially simultaneously.

The apparatus may be configured for substantially half of the odd lines of pixels and substantially half of the even lines of pixels corresponding to the rolling shutter configuration being exposed when a flash occurs; and interleaving lines of pixels together such that adjacent lines of pixels were alternately exposed during the flash and exposed without flash forming a new single image partially exposed to flash and partially not exposed to flash.

An example non-transitory program storage device readable by a machine may be provided, tangibly embodying a program of instructions executable by the machine for performing operations, the operations comprising: forming a new single image by reading out first lines of pixels of a sensor, when the first lines are read out in a sequence of the first lines in a first direction along the sensor; reading out different second lines of the pixels of the sensor, when the second lines are read out in a sequence of the second lines in a different second direction along the sensor; and interleaving the read outs from the first lines of pixels and the second lines of pixels to form a new single image.

The device may be configured for reading out the first lines of pixels and the different second lines of pixels starts at substantially the same time and continues sequentially substantially simultaneously.

The device may be configured for reading out first lines of pixels wherein the first lines of pixels are arranged in non-adjacent lines of pixels and different second lines of pixels are adjacent to first lines of pixels forming an alternating sequence of first lines of pixels and different second lines of pixels.

The device may be configured for reading out the first lines of pixels starts at substantially the same time as reading out of the different second lines of pixels.

The device may be configured for reading out the first lines of pixels in a first direction along the sensor starts at a first edge of the sensor and progresses toward an opposite edge of the sensor and reading out the different second lines of pixels in a different second direction starts at the opposite edge of the sensor and progresses toward the first edge of the sensor such that the first lines of pixels and the different second lines of pixels are read out sequentially in substantially opposite directions.

The device may be configured for a flash occurs at a predetermined time such that a plurality, but not all, of the first lines of pixels and a plurality, but not all, of the different second lines of pixels are being exposed when the flash occurs.

The device may be configured for the flash occurring when; exposure of substantially half of the first lines of pixels has ended and exposure of a remainder of first lines of pixels begins; and exposure of substantially half of the different second lines of pixels has ended and exposure of a remainder of different second lines of pixels begins.

The device may be configured for the first lines of pixels and the different second lines of pixels being read out using a rolling shutter configuration with the first lines of pixels being located on odd lines of pixels and different second lines of pixels being located on even lines of pixels with odd lines of pixels being adjacent to even lines of pixels and wherein; reading out odd lines of pixels sequentially from a first edge of the sensor toward an opposite edge and reading out even lines of pixels sequentially from the opposite edge toward the first edge with read out of both odd lines of pixels and even lines of pixels starting at the same time and continuing substantially simultaneously.

The device may be configured for substantially half of the odd lines of pixels and substantially half of the even lines of pixels corresponding to the rolling shutter configuration being exposed when a flash occurs; and interleaving lines of pixels together such that adjacent lines of pixels were alternately exposed during the flash and exposed without flash forming a new single image partially exposed to flash and partially not exposed to flash.

As used in this application, the term 'circuitry' may refer to the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example, and if applicable to the particular claim element, a baseband integrated circuit or applications processor integrated circuit for mobile phone or a similar integrated circuit in server, a cellular network device, or other network device.

Embodiments of the present invention may be implemented in software, hardware, application logic or a combination of software, hardware and application logic. The software, application logic and/or hardware may reside on the electronic device (such as on the memory, or another memory of the device), on a server, or any other suitable location. If desired, part of the software, application logic and/or hardware may reside on a device, and part of the software, application logic and/or hardware may reside on the server. In an example embodiment, the application logic, software or an instruction set is maintained on any one of various conventional computer-readable media. In the context of this document, a "computer-readable medium" may be any media or means that can contain, store, communicate propagate or transport the instructions for use by or in connection with an instruction execution system, apparatus, or device, such as a computer, with one example of a computer described and depicted in FIGS. 1 and 5. A computer-readable medium may comprise a computer-readable storage medium that may be any media or means that can contain or store the instructions for use by or in connection with an instruction execution system, apparatus, or device, such as a computer.

Below are provided further description of various non-limiting, exemplary embodiments. The below-described exemplary embodiments may be practiced in conjunction with one or more other aspects or exemplary embodiments. That is, the exemplary embodiments of the apparatus, such as those described immediately below, may be implemented, practiced or utilized in any combination (e.g., any combination that is suitable, practicable and/or feasible) and are not limited only to those combinations described herein and/or included in the appended claims.

In one exemplary embodiment, a method comprising reading out first lines of pixels of a sensor, when the first lines are read out in a sequence of the first lines in a first direction along the sensor reading out different second lines of the pixels of the sensor, when the second lines are read out in a sequence of the second lines in a different second direction along the sensor and interleaving the read outs from the first lines of pixels and the different second lines of pixels to form a new single image.

Conventional Flash/No-Flash imaging may use an image pair; one image with a flash and one image without a flash. However, the time difference between these two pair of images might be such big that the images have different content. Features as described herein allow for capture of a pair of Flash/No-Flash images within one frame with interleaving of the two images intelligently line-by-line (even lines and odd lines, some with flash and some with no flash). Time control with the lines between the flash illumination and the flash off may be optimised to cause as little as possible obscure to the two separate images caused by the transform from the no-flash to flash-on windows. Features as describe herein enable image capture within one single frame and, thus, provide equal, or almost equal, images for both flash and the no-flash images. Features as described herein may be used for even distribution and no overlapping, and compensate for problems caused by camera flash to images.

With features as described herein, since we have both a flash image and a no-flash image, if there are problems caused by the flash in the flash image, we have the non-flash image available to correct for the problem. Also, one can choose to turn-off the flash completely, and get a full resolution non-flash image if needed. In the 100 line example noted above and with respect to FIG. 7:

odd number lines between lines 1-49 and even number lines between lines 52-100 form the no-flash image, and even number lines between lines 2-50 and old number lines between lines 51-99 form the flash image.

A lower exposure may be needed for the flash images and, therefore, a provision of having different exposure settings for the rows to be exposed by the flash, in comparison to the ones which are not exposed by the flash may be provided.

In one example, one may go up to 1 ms as the time for which the flash is turned ON. 1 ms will mean that readout of about six to seven lines will have occurred, and those six to seven would not have the non-flash output. This problem can be circumvented by having multiple flashes, so as to provide the same intensity over a shorter duration of time. These multiple flashes may or may not be utilized on human faces, but can easily be exploited for any other scene. This ensures that the transition period can be brought down to 1 line, which may be preferred for this hardware to work perfectly in this 1 ms example.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. A method comprising:

exposing substantially half of first lines of pixels of a sensor and substantially half of different second lines of pixels of the sensor when a flash occurs;

reading out the first lines of pixels of the sensor, where the first lines are read out in a sequence of the first lines in a first direction along the sensor;

reading out the different second lines of the pixels of the sensor, where the second lines are read out in a sequence of the second lines in a different second direction along the sensor; and interleaving the read outs from the first lines and the second lines, where the interleaving of the read outs from the first and second lines of pixels comprises interleaving the readouts together such that adjacent lines of pixels are alternately exposed during the flash and exposed without flash forming a single new image partially exposed to flash and partially not exposed to flash.

2. The method of claim 1 wherein reading out the first lines of pixels and the different second lines of pixels starts at substantially a same time.

3. The method of claim 1 wherein the first lines of pixels are non-adjacent lines of pixels and the second lines are adjacent to first lines forming an alternating sequence of the first and second lines of pixels.

4. The method of claim 1 wherein:

the readout sequence of the first lines starts at a first edge of the sensor and progresses toward an opposite second edge of the sensor, and the readout sequence of the second lines starts at the opposite second edge of the sensor and progresses toward the first edge of the sensor, such that the first lines of pixels and the different second lines of pixels are read out sequentially in substantially opposite directions.

5. The method of claim 1 wherein:

the first lines of pixels and the different second lines of pixels are read out using a rolling shutter configuration with the first lines of pixels being located on odd lines of pixels and different second lines of pixels being located on even lines of pixels with odd lines of pixels being adjacent to even lines of pixels; and reading out odd lines of pixels sequentially from a first edge of the sensor toward an opposite edge and reading out even lines of pixels sequentially from the opposite edge toward the first edge with read out of both odd lines of pixels and even lines of pixels starting at the same time.

6. The method of claim 4 wherein the flash occurs at a predetermined time such that a plurality, but not all, of the first lines of pixels and a plurality, but not all, of the different second lines of pixels are being exposed when the flash occurs.

7. The method of claim 6 wherein the flash occurs when exposure of substantially half of the first lines has ended and exposure of a remainder of the first lines begins, and when exposure of substantially half of the second lines has ended and exposure of a remainder of second lines begins.

8. The method of claim 6 wherein the flash occurs when exposure of less than half of the first lines has ended, and exposure of less than half of the second lines has ended.

9. The method of claim 5 wherein:

substantially only half or less of the odd lines of pixels and substantially only half or less of the even lines of pixels corresponding to the rolling shutter configuration are being exposed when the flash occurs; and the interleaving comprises interleaving the read outs from the first and second lines of pixels together such that adjacent lines of pixels are alternately exposed during the flash and exposed without flash forming a single new image partially exposed to flash and partially not exposed to flash.

10. An apparatus comprising:

at least one processor; and at least one non-transitory memory including computer program code, the at least one memory and the computer program code configured to, with the at least one processor, cause the apparatus to:

expose substantially half of first lines of pixels of a sensor and substantially half of second lines of pixels of the sensor when a flash occurs;

generate data read out from the first lines of pixels of the sensor, where the first lines are read out in a sequence of the first lines in a first direction along the sensor;

read out the different second lines of the pixels of the sensor, where the second lines are read out in a sequence of the second lines in a different second direction along the sensor; and interleave the data read out from both the first lines with the second lines, where the interleave of the data read out from the first and second lines of pixels comprises interleaving the lines together such that adjacent lines of pixels are alternately exposed during the flash and exposed without flash forming a single new image partially exposed to flash and partially not exposed to flash.

11. The apparatus of claim 10 wherein the at least one memory and the computer program code are configured to, with the at least one processor, cause the apparatus to:

start read out of the first lines of pixels and the different second lines of pixels at substantially a same time.

12. The apparatus of claim 10 wherein the at least one memory and the computer program code are configured to, with the at least one processor, cause the apparatus to:

read out the first lines of pixels as non-adjacent lines of the pixels and the different second lines of pixels as adjacent to the first lines of pixels forming an alternating sequence of first lines of pixels and different second lines of pixels.

13. The apparatus of claim 10 wherein the at least one memory and the computer program code are configured to, with the at least one processor, cause the apparatus to:

read out the first lines of pixels and the different second lines of pixels using a rolling shutter configuration with the first lines of pixels being located on odd lines of pixels and the different second lines of pixels being located on even lines of pixels with the odd lines of pixels being adjacent to the even lines of pixels; and read out the odd lines of pixels sequentially from a first edge of the sensor toward an opposite second edge and read out the even lines of pixels sequentially from the opposite second edge toward the first edge with read out of both the odd lines and the even lines starting at the same time.

14. The apparatus of claim 12 wherein the at least one memory and the computer program code are configured to, with the at least one processor, cause the apparatus to:

read out the first lines of pixels starting at substantially a same time as reading out of the different second lines of pixels.

15. The apparatus of claim 14 wherein the at least one memory and the computer program code are configured to, with the at least one processor, cause the apparatus to:

trigger the flash at a predetermined time such that a plurality, but not all, of the first lines of pixels and a plurality, but not all, of the different second lines of pixels are being exposed when the flash occurs.

16. The apparatus of claim 15 wherein the at least one memory and the computer program code are configured to, with the at least one processor, cause the apparatus to have the flash occur when exposure of substantially half of the first lines of pixels has ended and exposure of a remainder of the first lines of pixels begins, and exposure of substantially half of the different second lines of pixels has ended and exposure of a remainder of the different second lines of pixels begins.

17. The apparatus of claim 14 wherein the at least one memory and the computer program code are configured to, with the at least one processor, cause the apparatus to:

read out the first lines of pixels in a first direction along the sensor starting at a first edge of the sensor and progressing toward an opposite edge of the sensor and read out the different second lines of pixels in a different second direction starting at the opposite edge of the sensor and progressing towards the first edge of the sensor, such that the first lines of pixels and the different second lines of pixels are read out sequentially in substantially opposite directions.

18. The apparatus of claim 15 wherein the at least one memory and the computer program code are configured to, with the at least one processor, cause the apparatus to have the flash occur when exposure of less than half of the first lines has ended, and exposure of less than half of the second lines has ended.

19. The apparatus of claim 13 wherein the at least one memory and the computer program code are configured to, with the at least one processor, cause the apparatus to:

where the exposing comprises exposing substantially half of the odd lines of pixels and substantially half of the even lines of pixels corresponding to the rolling shutter configuration when the flash occurs; and the interleaving comprises interleaving the first and second lines of pixels together such that adjacent lines of pixels are alternately exposed during the flash and exposed without flash forming a single new image partially exposed to flash and partially not exposed to flash.

20. A non-transitory program storage device readable by a machine, tangibly embodying a program of instructions executable by the machine for performing operations, the operations comprising:

exposing substantially half of first lines of pixels of a sensor and substantially half of second lines of pixels of a sensor when a flash occurs;

reading out the first lines of pixels of the sensor, where the first lines are read out in a sequence of the first lines in a first direction along the sensor;

reading out the different second lines of the pixels of the sensor, where the second lines are read out in a sequence of the second lines in a different second direction along the sensor; and interleaving the read outs from the first lines and the second lines, where the interleaving comprises the read outs from the first and second lines of pixels being interleaved together such that adjacent lines of pixels are alternately exposed during the flash and exposed without flash forming a single new image partially exposed to flash and partially not exposed to flash.

21. The device of claim 20 wherein reading out the first lines of pixels and the different second lines of pixels starts at substantially the same time and continues sequentially substantially simultaneously.

22. The device of claim 20 including reading out first lines of pixels wherein the first lines of pixels are arranged in non-adjacent lines of pixels and the different second lines of pixels are adjacent to first lines of pixels forming an alternating sequence of first lines of pixels and different second lines of pixels.

* * * * *